US009482375B2

(12) United States Patent
Paul

(10) Patent No.: US 9,482,375 B2
(45) Date of Patent: Nov. 1, 2016

(54) HOSE CONNECTOR ASSEMBLY FOR COUPLING PRESSURIZED HOSES

(71) Applicant: Zbigniew Robert Paul, University Park, FL (US)

(72) Inventor: Zbigniew Robert Paul, University Park, FL (US)

(*) Notice: Subject to any disclaimer, the term of this patent is extended or adjusted under 35 U.S.C. 154(b) by 295 days.

(21) Appl. No.: 14/200,341

(22) Filed: Mar. 7, 2014

(65) Prior Publication Data
US 2014/0252760 A1   Sep. 11, 2014

Related U.S. Application Data

(60) Provisional application No. 61/774,574, filed on Mar. 7, 2013.

(51) Int. Cl.
*F16L 33/22* (2006.01)
(52) U.S. Cl.
CPC ................... *F16L 33/224* (2013.01)
(58) Field of Classification Search
CPC . F16L 33/207; F16L 33/2071; F16L 33/223; F16L 33/226; F16L 33/224
USPC ......................................... 285/243
See application file for complete search history.

(56) References Cited

U.S. PATENT DOCUMENTS

| | | | | |
|---|---|---|---|---|
| 476,752 A * | 6/1892 | Lenty | ............ | F16L 27/0816 285/148.15 |
| 919,444 A * | 4/1909 | Loetzer | ............ | F16L 33/224 285/249 |
| 927,388 A * | 7/1909 | Watkins | ............ | F16L 33/222 285/243 |
| 1,006,671 A * | 10/1911 | Myer | ............ | F16L 33/223 285/247 |
| 1,098,294 A * | 5/1914 | Patty | ............ | F16L 33/222 285/249 |
| 1,844,023 A * | 2/1932 | Terry | ............ | F16L 33/222 285/243 |
| 1,934,022 A * | 11/1933 | Wiggins | ............ | F16L 19/046 285/289.3 |
| 2,319,024 A * | 5/1943 | Wehringer | ............ | F16L 33/225 285/256 |
| 2,513,115 A * | 6/1950 | Sprigg | ............ | F16L 33/224 285/249 |
| 2,560,565 A * | 7/1951 | Freeman | ............ | F16L 33/207 24/19 |
| 2,877,027 A * | 3/1959 | Bagnell | ............ | F16L 33/01 285/113 |
| 3,442,537 A * | 5/1969 | Mack | ............ | B21K 1/16 285/148.13 |
| 3,843,169 A * | 10/1974 | Wise | ............ | F16L 33/224 285/133.4 |
| 4,114,930 A * | 9/1978 | Perkins | ............ | B21D 39/04 285/334.5 |
| 4,236,736 A * | 12/1980 | Anderson | ............ | F16L 47/32 285/125.1 |

(Continued)

*Primary Examiner* — Brent W Herring
(74) *Attorney, Agent, or Firm* — The Watson I.P. Group, PLC; Jovan N. Jovanovic; Vladan M. Vasiljevic

(57) ABSTRACT

A hose connector assembly configured to repair or connect hoses, such as hydraulic hoses including a crimping sleeve, a hose insert and a first and second clamping nut. The hose insert is positioned within the crimping sleeve. The first clamping nut extends about the crimping sleeve on one side with the second clamping nut extending about the crimping sleeve on the other side. Whereupon, the tightening of the first clamping nut directs the crimping sleeve toward the hose insert to clamp a hose therebetween, and the tightening of the second clamping nut directs the crimping sleeve toward the hose insert to clamp a hose therebetween. The hose insert having a bore extending therethrough so as to place the hose portions in sealed fluid engagement through the bore.

15 Claims, 6 Drawing Sheets

(56) References Cited

U.S. PATENT DOCUMENTS

| | | | | |
|---|---|---|---|---|
| 4,278,279 A * | 7/1981 | Zimmerman | F16L 37/101 | 285/23 |
| 4,412,693 A * | 11/1983 | Campanini | F16L 27/0816 | 285/148.13 |
| 4,437,689 A * | 3/1984 | Goebel | F16L 33/223 | 285/246 |
| 4,508,374 A * | 4/1985 | Kantor | F16L 19/0283 | 285/319 |
| 4,635,972 A * | 1/1987 | Lyall | F16L 31/00 | 285/242 |
| 4,666,190 A * | 5/1987 | Yamabe | F16L 33/222 | 285/248 |
| 4,705,304 A * | 11/1987 | Matsuda | F16L 25/0036 | 285/243 |
| 4,736,969 A * | 4/1988 | Fouts | F16L 33/223 | 285/245 |
| 5,149,145 A * | 9/1992 | Yokomatsu | F16L 37/0925 | 285/101 |
| 5,178,423 A * | 1/1993 | Combeau | F16L 33/223 | 285/245 |
| 5,332,269 A * | 7/1994 | Homm | B25B 27/10 | 285/249 |
| 5,388,871 A * | 2/1995 | Saitoh | F16L 19/0218 | 285/247 |
| 5,904,376 A * | 5/1999 | Yuen | F16L 33/223 | 285/148.19 |
| 6,193,239 B1 * | 2/2001 | Fukano | F16L 19/028 | 277/615 |
| 6,209,804 B1 * | 4/2001 | Spriegel | F16L 33/223 | 239/373 |
| 6,412,484 B1 * | 7/2002 | Izuchukwu | A61M 16/208 | 128/202.19 |
| 6,513,839 B2 * | 2/2003 | Nishio | F16L 19/02 | 285/331 |
| 6,517,123 B2 * | 2/2003 | Nishio | F16L 47/04 | 285/331 |
| 6,896,299 B1 * | 5/2005 | Nishio | F16L 47/04 | 285/331 |
| 6,991,266 B2 * | 1/2006 | Nishio | F16L 47/04 | 285/331 |
| 7,367,594 B2 * | 5/2008 | Evans | F16L 33/223 | 285/247 |
| 7,530,602 B2 * | 5/2009 | Fujii | F16L 19/028 | 285/123.15 |
| 7,648,178 B1 * | 1/2010 | Andros | F16L 33/223 | 285/247 |
| 7,744,018 B2 * | 6/2010 | Alexander | F16L 33/223 | 239/124 |
| 9,091,374 B2 * | 7/2015 | Sekino | F16L 19/0283 | |
| 9,194,517 B2 * | 11/2015 | Peirce | F16L 33/223 | |
| 2007/0016166 A1 * | 1/2007 | Thistle | A61M 39/0208 | 604/533 |
| 2007/0284461 A1 * | 12/2007 | Alexander | F16L 33/223 | 239/526 |
| 2013/0257041 A1 * | 10/2013 | Peirce | F16L 33/223 | 285/247 |
| 2013/0307265 A1 * | 11/2013 | Sekino | F16L 19/0283 | 285/382.5 |
| 2014/0138944 A1 * | 5/2014 | Kury | F16L 33/2071 | 285/239 |
| 2015/0292661 A1 * | 10/2015 | Gilbreath | F16L 33/223 | 285/90 |

* cited by examiner

HOSE CONNECTOR ASSEMBLY FOR COUPLING PRESSURIZED HOSES

CROSS-REFERENCE TO RELATED APPLICATION

This application claims priority to U.S. Provisional Patent Application Ser. No. 61/774,574 filed Mar. 7, 2013, entitled "Device utilizing basic tools for reattachment or repair of pressurized hoses," the entire disclosure of which is hereby incorporated by reference.

BACKGROUND OF THE DISCLOSURE

1. Field of the Disclosure

The invention relates in general to a connector, and more particularly, to a hose connector assembly which is particularly well suited for repairing flexible hoses, such as hydraulic hoses or tubing. While not particularly limited thereto, the hose connector assembly is particularly well suited to the repair of flexible hoses of the type used with hydraulic cylinders, and more particularly, hydraulic cylinders typically utilized in association with convertible tops in automobiles. The disclosure is not limited to solely such a use.

2. Background Art

Hydraulic hoses are the means by which to convey hydraulic fluid in systems where a pump delivers pressurized fluid through a hose to a hydraulic actuator or cylinder. Such hydraulic actuators or cylinders are known in the art as a means for delivering linear or angular force to an object. The uses of such hydraulic actuators or cylinders is well known in the art of industrial robotics, construction equipment and automobiles.

For example, in the automotive arena, hydraulic systems are utilized to open and close convertible tops, trunks, hatches, hoods and doors, as well as with self-leveling suspension. Focusing on the automotive application for purposes of example solely, and not for purposes of limitation, hydraulic hoses in automotive applications are generally permanently attached to actuators. As such, the hoses are not readily removable and reattachable to the respective actuators or cylinders. In fact, the hoses and the actuator are coupled to the pump only and removable as a unit, typically. While the actuator may be located in any location within the vehicle, the hydraulic pump (with fluid reservoir) is generally located in the trunk. Among other examples of such configurations, the following vehicles utilize such a configuration: 2004 Mercedes-Benz model SL500, 1999 Mercedes-Benz model SLK 230, 2001 BMW model 325i and 2002 Ferrari model 360 Spyder. There are certainly others that are known to those of skill in the art.

In each of the foregoing, the cylinder/actuator with the permanently attached hoses can be very difficult to replace. For example, the actuator that is found at the front of a convertible top above the frame of a windshield includes hydraulic hoses that extend back into the trunk following a generally extremely convoluted path. The removal of the hoses may require the disassembly of interior panels and cutting away dozens of plastic straps from their hose attachment points. Such a removal and replacement may take on the order of ten or more man-hours.

In other instances, the actuator may be fully operational, but one of the hydraulic hoses has become compromised and has a leak therealong. Again, as the actuator and the hoses are offered as a single unit, a full replacement is required, even for a small isolated damaged portion of the hydraulic hose.

As a result, it is an object of the present disclosure to provide for a hose connector assembly which can couple two ends of a hydraulic hose into operable fluid tight communication with each other.

It is another object to provide a method of repairing hoses, and, among other hoses, hoses that are generally coupled to hydraulic actuators or cylinders.

These and other objects of the present disclosure will be set forth in the specification hereinbelow.

SUMMARY OF THE DISCLOSURE

The disclosure is directed to, in one aspect, a hose connector assembly for coupling two ends of a hose in a fluid tight configuration. The hose connector assembly includes a crimping sleeve, a hose insert and a first and second clamping nut. The crimping sleeve has a central body with a first side and a second side. A first crimp sleeve extends outwardly from the first side of the central body. A second crimp sleeve extends outwardly from the second side of the central body. The crimping sleeve has an internal bore extending therethrough. Each of the first and second crimp sleeves each include an outer surface having a threaded region. At least one relief slot extends inwardly from a distal end of and along each of the first and second crimp sleeves. The hose insert has a central body with a first side and a second side. A first side hose insert extends outwardly from the first side of the central body. A second side hose insert extends outwardly from the second side of the central body. The hose insert has a central bore extending therethrough. The hose insert is positionable within the crimping sleeve so that the central body of the hose insert is within the internal bore proximate the central body. The first side hose insert extends into the portion of the internal bore corresponding to the first crimp sleeve. The second side hose insert extends into the portion of the internal bore corresponding to the second crimp sleeve. A space is defined between the first side hose insert and the first crimp sleeve. Likewise, a space is defined between the second side hose insert and the second crimp sleeve.

The first clamping nut has a bore extending therethrough. The bore includes a threaded portion and a bore portion. It will be understood that threading of the first clamping nut onto the first crimp sleeve directs the first crimp sleeve axially inwardly toward the first side hose insert. This, in turn, sandwiches a hose positioned within the space defined therebetween. Similarly, the second clamping nut includes a bore extending therethrough. The bore includes a threaded portion and a bore portion. Threading of the second clamping nut onto the second crimp sleeve directs the second crimp sleeve axially inward toward the second side hose insert. As a result, a hose positioned within the space defined therebetween is sandwiched by the two elements.

In a preferred embodiment, the hose insert is slidably positionable within the internal bore of the crimping sleeve.

In another preferred embodiment, the first crimp sleeve includes a proximal end and a distal end. The proximal end extends from the first side of the central body. The threaded portion extends from a point between the proximal end and the distal end toward the proximal end. The first crimp sleeve tapers inwardly from a point between the proximal end and the distal end toward the distal end.

In some such preferred embodiments, at least a portion of the first crimp sleeve has a conical configuration.

In some such preferred embodiments, the second crimp sleeve includes a proximal end and a distal end. The proximal end extends from the second side of the central body. The threaded portion extends from a point between the proximal end and the distal end toward the proximal end. The second crimp sleeve tapering inwardly from a point between the proximal end and the distal end toward the distal end.

In another preferred embodiment, the first side hose insert includes a pattern disposed on an outer surface thereof. A flange is defined proximate a proximal end thereof, so as to preclude further inward movement of a hose extending therearound.

In another such embodiment, the second side hose insert includes a pattern disposed on an outer surface thereof. A flange is defined proximate a proximal end thereof, so as to preclude further inward movement of a hose extending therearound.

In some such preferred embodiments, the pattern of the first side hose insert comprises a plurality of barbs which resist disconnection of a hose extending therearound. Similarly, the pattern of the second side hose insert comprises a plurality of barbs which resist disconnection of a hose extending therearound.

In another preferred embodiment, the portion of the internal bore of the central body corresponding to each of the first crimp sleeve and the second crimp sleeve includes a surface pattern thereon.

In another preferred embodiment, the bore portion of the bore of the first and second clamping nuts are inwardly tapered so as to reduce the diameter thereof toward an outer end thereof.

In yet another preferred embodiment, each of the first and second clamping nuts include an outer surface. The outer surface of each including a hexagonal configuration for readily accepting a wrench.

In another preferred embodiment, each of the first and second crimp sleeves include at least two relief slots that are radially spaced apart from each other. In some such preferred embodiments, the at least two relief slots of each of the first and second crimp sleeves are equidistantly radially spaced apart from each other.

In another preferred embodiment, the central body of the hose insert includes a first side and a second side, and an outer surface spanning therebetween. A chamfer is defined at the first side of the outer surface and a chamfer is defined at the second side of the outer surface. Such a configuration enhances the ability to slidably insert the hose insert into the crimping sleeve.

In another preferred embodiment, the crimping sleeve comprises a single monolithic member that is machined into the desired final configuration.

In another aspect of the disclosure, the disclosure is directed to a method of coupling a first hose end and a second hose end. The method comprises the steps of: providing a first hose end; providing a second hose end; providing a hose connector assembly of the type described herein; extending the first clamping nut along the first hose end; extending the second clamping nut along the second hose end inserting the first hose end into the space defined between the first side hose insert and the first crimp sleeve; inserting the second hose end into the space defined between the second side hose insert and the second crimp sleeve; tightening the first clamping nut onto the first crimp sleeve, thereby sandwiching the first hose end between the first crimp sleeve and the first side hose insert; tightening the second clamping nut onto the second crimp sleeve, thereby sandwiching the second hose end between the second crimp sleeve and the second side hose insert.

BRIEF DESCRIPTION OF THE DRAWINGS

The disclosure will now be described with reference to the drawings wherein.

DETAILED DESCRIPTION OF THE DISCLOSURE

Figures 1, 6:
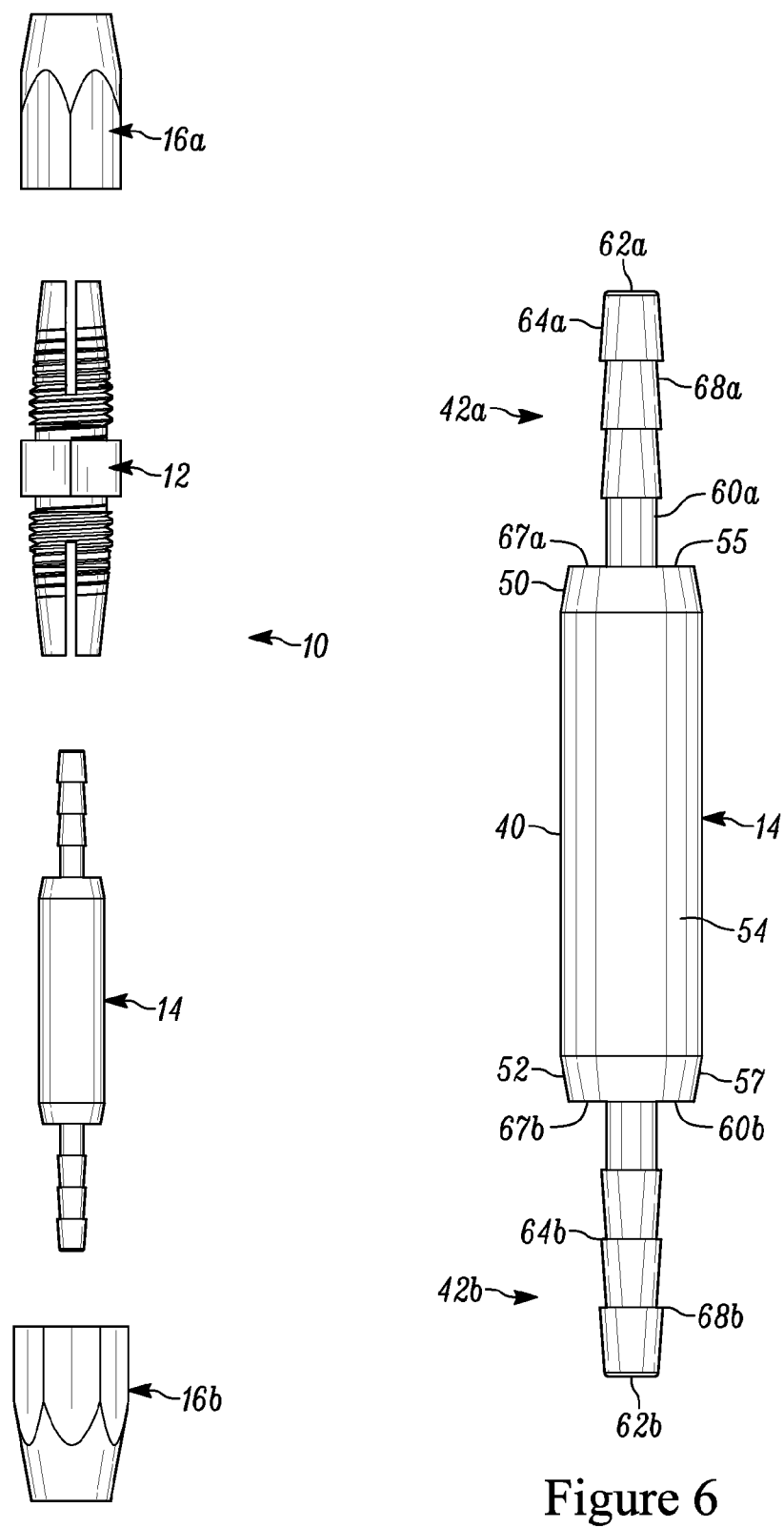
FIG. 1 of the drawings is an exploded view of the hose connector assembly, showing, the crimping sleeve with the hose insert and the first and second crimping nuts.
FIG. 6 of the drawings is a side elevational view of the hose insert of the present disclosure.
Figure 2:
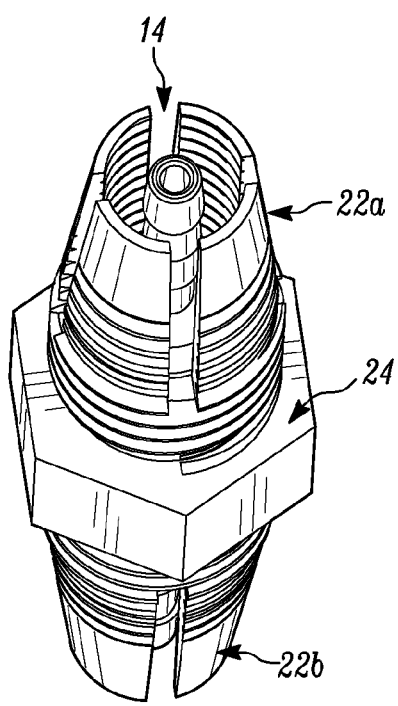
FIG. 2 of the drawings is a perspective view of a portion of the hose connector of the present disclosure, showing, in particular, the hose insert positioned within the crimping sleeve.
Figure 3:
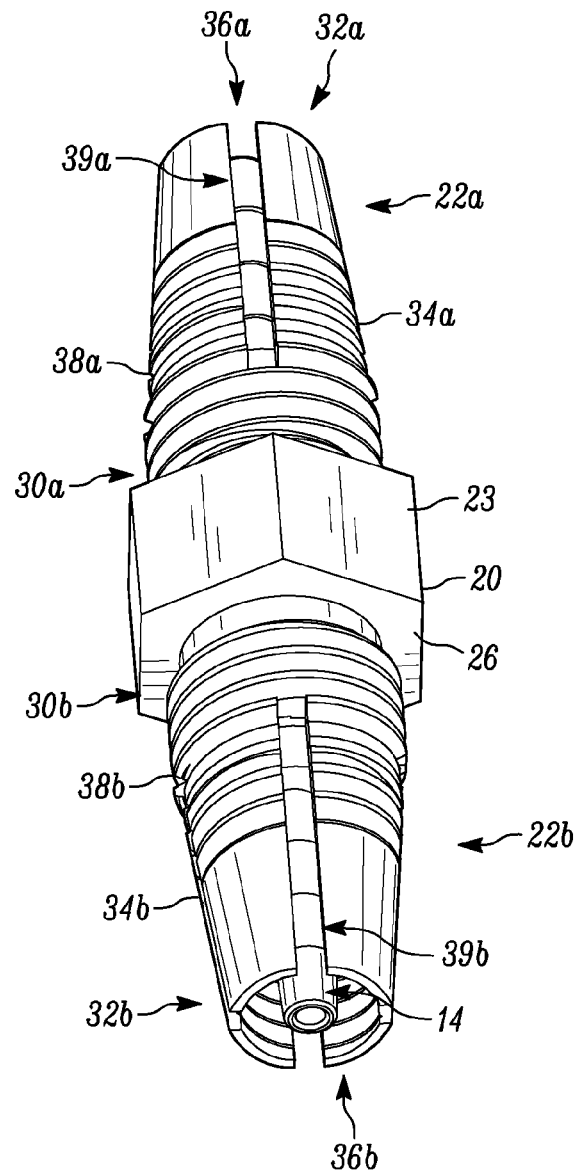
FIG. 3 of the drawings is a perspective view of the portion of the hose connector of the present disclosure shown in FIG. 2.
Figure 4:
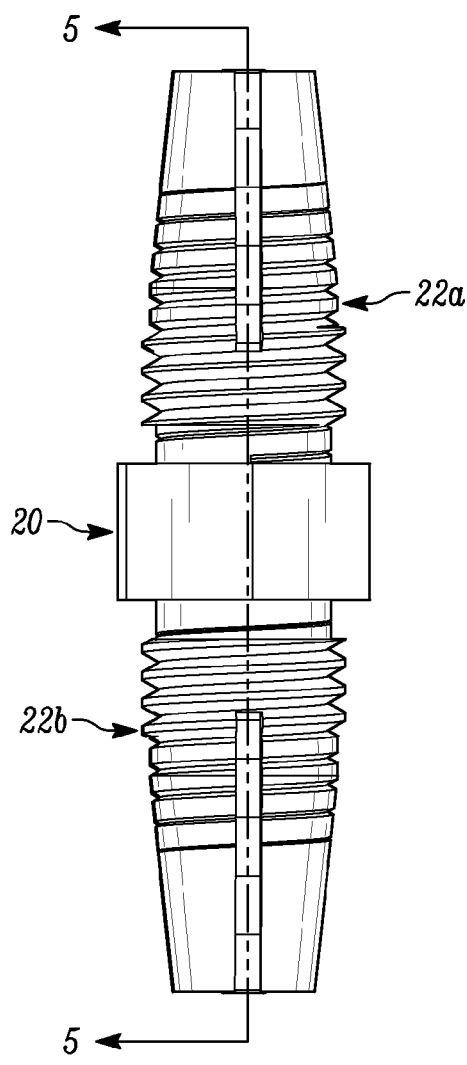
FIG. 4 of the drawings is a side elevational view of the portion of the hose connector of the present disclosure shown in FIG. 2.
Figure 5:
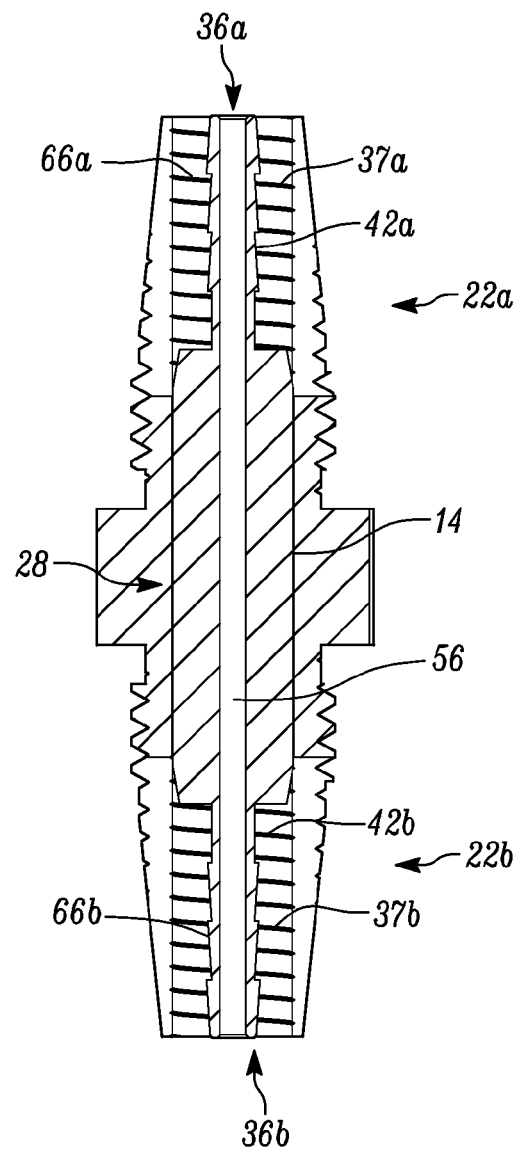
FIG. 5 of the drawings is a cross-sectional view of the portion of the hose connector of the present disclosure shown in FIG. 2, taken generally about lines 5-5 of FIG. 4.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the hose connector assembly is shown generally at 10. The hose connector assembly, as will be described below, and which is shown in the drawings, is configured for use in association with hydraulic lines of the type that are utilized with automotive hydraulic cylinders that control and actuate the movement of a convertible top, for example. Typically, the hose connector assembly is utilized to join two hose ends in sealed fluid communication. Typically, such hoses are relatively high pressure and are generally quite stiff. Typically, although not required, the hoses are made of single or multiple annular layers of rubber, woven fabric, thermoplastic or other polymers. Generally, the hoses have an inner bore diameter of approximately 1.5 to 2.5 mm (and most often a bore of 1.8 mm or 2.0 mm) with an outer diameter of approximately 3.5 to 5 mm. These are merely exemplary, and the disclosure is not limited to hoses of such dimensions.

The hose connector assembly 10 is shown in the Figures as comprising crimping sleeve 12, hose insert 14, first clamping nut 16a and second clamping nut 16b. As will be explained, the hose insert 14 is inserted into the crimping sleeve, with the first clamping nut and the second clamping nut extending over a portion of the crimping sleeve on either side thereof. While the disclosure is not limited to the use of any particular materials, the components of the hose connector assembly may comprise metal materials, such as aluminum, brass, steel or stainless steel, or alloys thereof. The disclosure is not limited to the use of any particular materials.

With reference to FIGS. 2 through 5, the crimping sleeve 12 includes a central body 20, first crimp sleeve 22a and second crimp sleeve 22b. The central body 20 includes outer surface 23, first side 24, second side 26 opposite the first side 24 and internal bore portion 28. The first crimp sleeve 22a extends from the first side 24 of the central body 20, and includes proximal end 30a, distal end 32a, outer surface 34a and first side internal bore 36a. The proximal end 30a is at the first side of the central body 20. The outer surface comprises a generally cylindrical portion that includes a threaded region 38a near the proximal end 30a. The outer surface tapers inwardly to a conical configuration toward the distal end 32a thereof. The threaded region extends onto the conical portion. The conical portion further includes at least one relief slot 39a extending therethrough. In the embodiment shown, four relief slots that are evenly spaced apart axially are shown. In other embodiments a pair of relief slots may be utilized on opposing sides of each other.

The first side internal bore 36a comprises a generally uniform diameter opening of substantially uniform cross-sectional diameter. A plurality of surface patterns 37a are disposed along the internal bore, and especially along the portion which includes the at least one relief slot 39a. In the embodiment shown, the surface patterns comprise a plurality of spaced apart teeth that extend in a direction that is perpendicular to the bore.

The second crimp sleeve 22b is generally a mirror image of the first crimp sleeve 22a. Thus, the second crimp sleeve 22b extends from the second side 26 of the central body 20 in a direction opposite that of the first crimp sleeve 22a. The second crimp sleeve 22b includes proximal end 30b, distal end 32b, outer surface 34b and second side internal bore 36b. The proximal end 30b is at the second side of the central body 20. The outer surface comprises a generally cylindrical portion that includes a threaded region 38b near the proximal end 30b. The outer surface tapers inwardly to a conical configuration toward the distal end 32b thereof. The threaded region extends onto the conical portion. The conical portion further includes at least one relief slot 39b extending therethrough. In the embodiment shown, four relief slots that are evenly spaced apart axially are shown. In other embodiments a pair of relief slots may be utilized on opposing sides of each other.

The first side internal bore 36b comprises a generally uniform diameter opening of substantially uniform cross-sectional diameter. A plurality of surface patterns 37b are disposed along the internal bore, and especially along the portion which includes the at least one relief slot 39b. In the embodiment shown, the surface patterns comprise a plurality of spaced apart teeth that extend in a direction that is perpendicular to the bore.

It will be understood that the internal bore portion 28 of the central body 20 and the first and second side internal bores 36a, 36b are collinear and generally, together, define the internal bore of the crimping sleeve, and typically share a common central axis. It is contemplated that crimping sleeve comprises a single monolithic member that is machined into the final configuration. Such a monolithic member has advantages from the standpoint of a minimization of components and adds to the robustness of the design (i.e., minimizing leaks at joints and the like). In addition, such a configuration minimizes distortion of the hose (i.e., twisting and the like). Of course, multiple components could be utilized.

The hose insert 14 is shown in FIG. 6 (and also in FIG. 5, within the crimping sleeve) as comprising central body 40, first side hose insert 42a and second side hose insert 42b. The central body 40 includes first side 50, second side 52, outer surface 54 and central bore 56. Generally, the central body has a substantially uniform diameter having a chamfer 55 at the first side 50 thereof, and a chamfer 57 at the second side 52 thereof. The central body is of a generally cylindrical configuration and includes a dimension that generally corresponds to the internal bore portion 28 of the central body 20, such that the central body 40 fits snugly within the internal bore portion 28. In another embodiment the crimping sleeve and hose insert may be machined from a single material.

The first side hose insert 42a comprises a generally cylindrical configuration that includes proximal end 60a, distal end 62a, outer surface 64a and central bore 66a. The first side hose insert extends from the first side 50 of the central body and is generally coaxial therewith. The central bore 66a generally corresponds to the central bore 56 of the central body. The outer surface 64a of the first side hose insert includes pattern 68a, which in the embodiment shown comprises a plurality of spaced apart ridges each of which encircles the outer surface. The edges may comprise barbs which tend to allow insertion of the hose, but provide additional resistance to removal thereof.

At the interface of the first side hose insert 42a and the first side 50 of the central body 40, a flange 67a is defined. As will be explained, this flange forms the physical stop for the hose that is inserted over the first side hose insert 42a.

As will be explained, when installed, the distal end 62a of the first side hose insert matches the distal end 32a of the first crimp sleeve 22a.

The second side hose insert 42b is substantially a mirror image of the first side hose insert 42a. The second side hose insert 42b extends on the opposite side of the central body from the first side hose insert. The second side hose insert 42b likewise comprises a generally cylindrical configuration that includes proximal end 60b, distal end 62b, outer surface 64b and central bore 66b. The second side hose insert extends from the second side 52 of the central body and is generally coaxial therewith. The central bore 66b generally corresponds to the central bore 56 of the central body and the central bore 66a of the first side hose insert. The outer surface 64b of the second side hose insert includes pattern 68b, which in the embodiment shown comprises a plurality of spaced apart ridges each of which encircles the outer surface. The edges may comprise barbs which tend to allow insertion of the hose, but provide additional resistance to removal thereof.

At the interface of the second side hose insert 42b and the second side 52 of the central body 40, a flange 67b is defined. As will be explained, this flange forms the physical stop for the hose that is inserted over the second side hose insert 42b. As will be explained, when installed, the distal end 62b of the second side hose insert matches the distal end 32b of the first crimp sleeve 22b.

Figure 11:
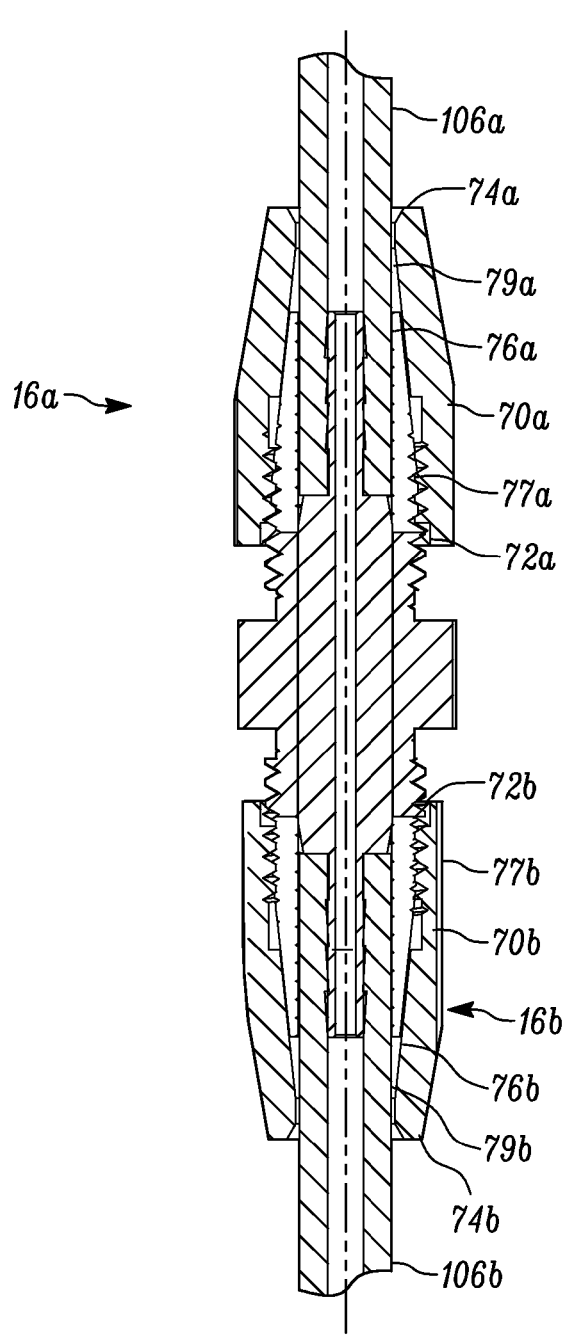
FIG. 11 of the drawings is a cross-sectional view of the hose connector assembly shown in FIG. 7 with the first and second clamping nuts being directed into contact with the respective one of the first and second crimp sleeves of the crimping sleeve, taken generally about lines 11-11 of FIG. 9.
Figure 12:
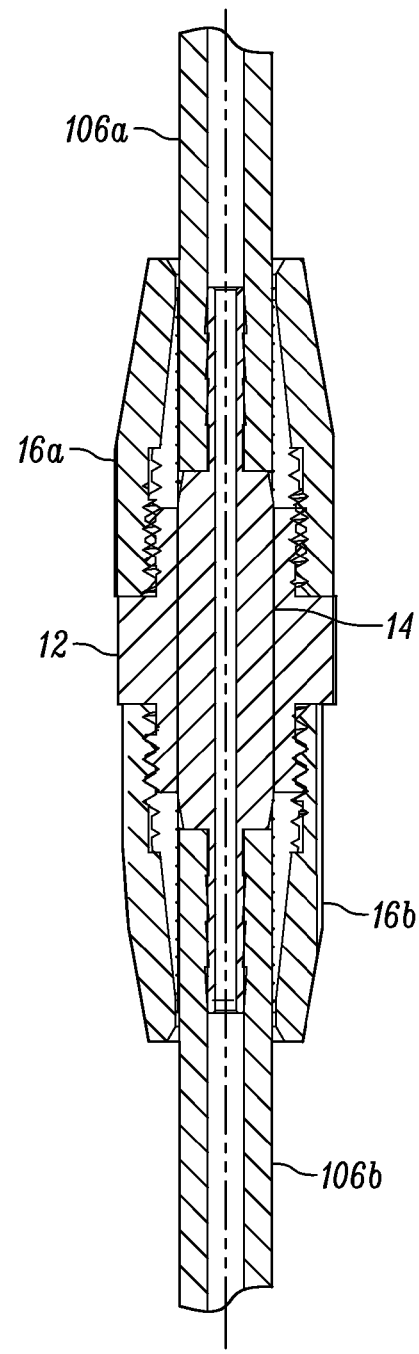
FIG. 12 of the drawings is a cross-sectional view of the hose connector assembly shown in FIG. 7 with the assembly fully clamping opposing hoses, to effectuate a repair, taken generally about lines 12-12 of FIG. 10.

The first clamping nut 16a is shown in FIG. 11 as comprising outer surface 70a, inner end 72a, outer end 74a, and bore 76a. The outer surface 70a includes a hexagonal portion which is configured to be grasped and mated with a wrench or the like. Of course, other configurations are contemplated. The distal end of the outer surface comprises an inwardly conical or tapered configuration. The bore 76a includes threaded portion 77a and smooth bore portion 79a. The threaded portion 77a is configured to matingly threadingly engage with the thread region 38a of the first crimp sleeve 22a.

The smooth bore portion 79a generally comprises a diameter that is smaller than the threaded portion. The smooth bore portion is configured to have a diameter such that, and as will be explained below, successive engagement of the threaded portion with the threaded region of the first crimp sleeve, will direct the first clamping nut 16a toward the central body 20, and push the outer surface 34a that includes the relief slots inwardly toward the respective first side hose insert 42a, thereby crimping the hose positioned therebetween. In the embodiment shown, the smooth bore portion is tapered toward the distal end, although variations are contemplated. In addition, while the bore is shown to be smooth, in other embodiments, a surface pattern or variation may be present thereon.

Figure 10:
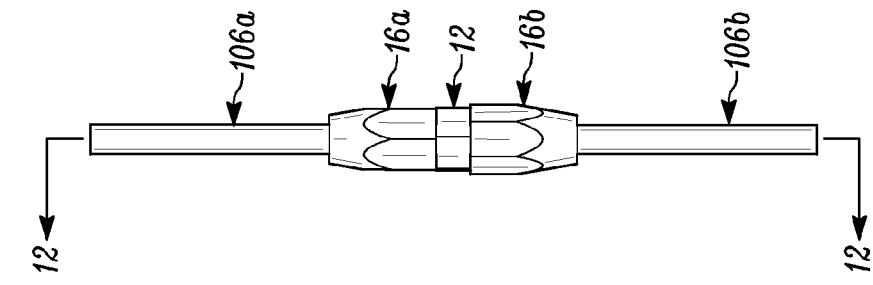
FIG. 10 of the drawings is a side elevational view of the hose connector assembly shown in FIG. 7 with the assembly fully clamping opposing hoses, to effectuate a repair.
Figure 9:
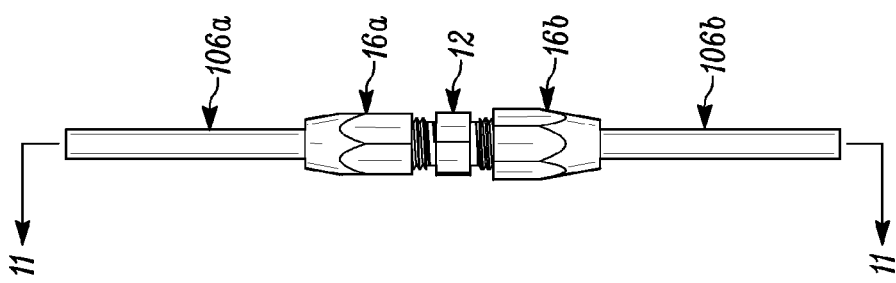
FIG. 9 of the drawings is a side elevational view of the hose connector assembly shown in FIG. 7 with the first and second clamping nuts being directed into contact with the respective one of the first and second crimp sleeves of the crimping sleeve.

The second clamping nut 16b is substantially identical to the first clamping nut 16a, and in most embodiments the two clamping nuts are generally interchangeable. The second clamping nut 16b is shown in FIG. 10 as comprising outer surface 70b, inner end 72b, outer end 74b, and bore 76b. The outer surface 70b includes a hexagonal portion which is configured to be grasped and mated with a wrench or the like. Of course, other configurations are contemplated. The distal end of the outer surface comprises an inwardly conical or tapered configuration. The bore 76b includes threaded portion 77b and smooth bore portion 79b. The threaded portion 77b is configured to matingly threadingly engage with the thread region 38b of the second crimp sleeve 22b.

The smooth bore portion 79b generally comprises a diameter that is smaller than the threaded portion. The smooth bore portion is configured to have a diameter such that, and as will be explained below, successive engagement of the threaded portion with the threaded region of the second crimp sleeve, will direct the second clamping nut 16b toward the central body 20, and push the outer surface 34b that includes the relief slots inwardly toward the respective first side hose insert 42b, thereby crimping the hose positioned therebetween. In the embodiment shown, the smooth bore portion is tapered toward the distal end, although variations are contemplated. In addition, while the bore is shown to be smooth, in other embodiments, a surface pattern or variation may be present thereon.

Figure 13:
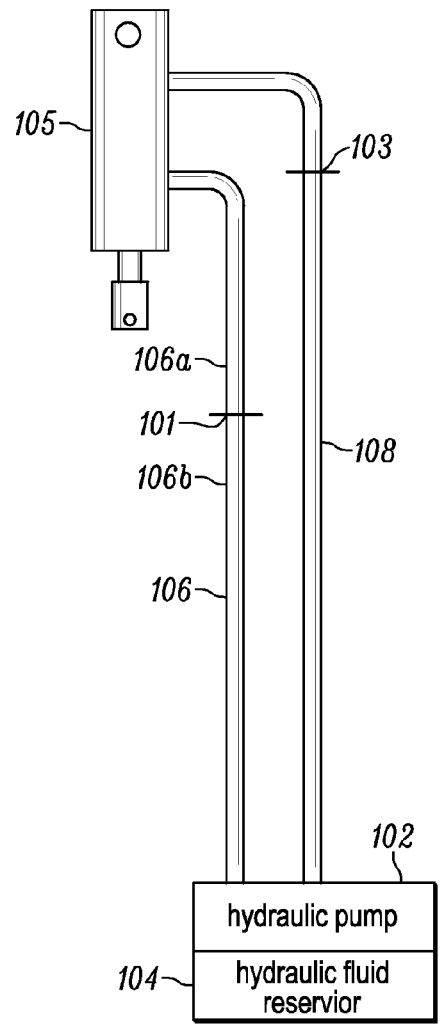
FIG. 13 of the drawings is a schematic representation of a typical hydraulic cylinder and pump assembly, showing, in particular, the locations wherein the splice repair can be undertaken to replace a faulty hydraulic cylinder, for example, or to repair crimped or broken hoses at such locations.

The operation of the device will be set forth with particular reference to FIGS. 7 through 14. In particular, and as shown in FIG. 13, a conventional convertible top hydraulic system is shown schematically. That is, a hydraulic pump 102 is presented with a hydraulic fluid reservoir 104, along with a hydraulic cylinder 105. A pair of hoses 106, 108 run between the hydraulic pump and the hydraulic cylinder. It will be understood that the pair of hoses may be deeply embedded within the vehicle with very limited access. In such cases, it is often the case that the most difficult portion of the repair of the hydraulic cylinder is the removal of the interior, exterior and trim pieces from the car to be able to access and disconnect the hoses.

In such instances, where replacement of the hydraulic cylinder is necessitated (i.e., the hydraulic cylinder leaks, or has otherwise failed), the present hose connector assembly 10 can be utilized. With continued reference to FIG. 13, and the repair as shown schematically, the portion of the hose proximate the hydraulic cylinder is easily accessible, and, as such, each of the hydraulic hoses 106, 108 will be cut at the points 101, 103, respectively. Once cut, a replacement hydraulic cylinder will be provided with hoses attached thereto. A pair of hose connector assemblies 10 of the present disclosure can be employed to couple, in fluid communication, the hydraulic hose segments at the points 101, 103.

Figure 8:
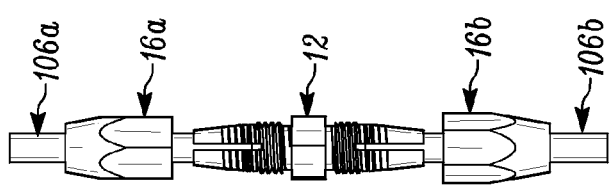
FIG. 8 of the drawings is a side elevational view of the hose connector assembly shown in FIG. 7, with the ends of the opposing hoses being inserted over the first and second side hose inserts of the hose insert.
Figure 7:
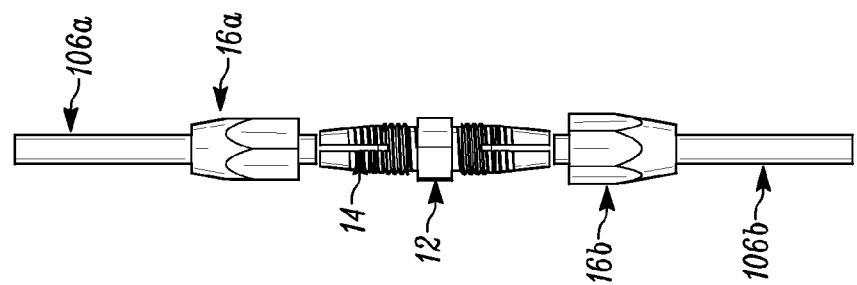
FIG. 7 of the drawings is a side elevational view of the hose connector assembly prior to the coupling of opposing hose portions to the hose insert.

More specifically, reference is made to FIGS. 7 through 12 (along with the detailed FIGS. 2 through 6) wherein a sample connection methodology is disclosed. In these Figures, the hydraulic hoses 106a and 106b are shown as being coupled by the hose connector assembly 10. In particular, the first clamping nut 16a is extended over the end of the hydraulic hose 106a. Similarly, the second clamping nut 16b is extended over the end of the hydraulic hose 106b. With reference to FIG. 8, the hose insert 14 is pressed into the crimping sleeve. In particular, the central body 40 is extended through the internal bore portion 28 of the central body 20. The insertion continues until the hose insert is fully inserted and positioned as desired. In the embodiment shown, at a full insertion, the distal end 32a of the first crimp sleeve 22a lines up with the distal end 62a of the first side hose insert 42a. At the same time the distal end 32b of the second crimp sleeve 22b lines up with the distal end 62b of the second side hose insert 42b.

Once the insertion is completed of the hose insert into the crimping sleeve, the hoses 106a, 106b can be inserted over the respective first and second side hose inserts 42a, 42b. In particular, the end of hose 106a is directed over the distal end 60a of the first side hose insert 42a. The dimensions are such that some resistance will generally be encountered to the insertion. Further insertion eventually directs the end of the hose into contact with the flange 67a which precludes further insertive movement. When inserted, the hose 106a is positioned between the first crimp sleeve 22a and the first side hose insert 42a. The barbs on the outer surface of the first side hose insert 42*a* generally resist the removal of the hose 106*a* from the inserted and seated position.

The same type of insertion can be imparted upon the second side hose insert 42*b*. In particular, the hose 106*b* is directed over the second side hose insert 42*b*. More particularly, the end of the hose is directed over the distal end 60*b* of the second side hose insert 42*b*. The dimensions are such that some resistance will generally be encountered to the insertion, as with the hose 106*a*. Eventually, the hose end is directed into contact with the flange 67*b* which precludes further insertive movement. When fully inserted, the hose 106*b* is positioned between the second crimp sleeve 22*b* and the second side hose insert 42*b*. The barbs on the outer surface of the second side hose insert 42*b* generally resist the removal of the hose 106*b* from the inserted and seated position.

Next, the respective first and second clamping nuts 16*a*, 16*b* are coupled to the proper end of the crimping sleeve 12. In particular, the clamping nut 16*a* is directed over the distal end 32*a* of the first crimp sleeve 22*a*. The threaded portion of the bore 76*a* eventually contacts and initiates mating with the threaded region 38*a* of the first crimp sleeve 22*a*. As the clamping nut 16*a* is tightened (i.e., directed toward the central body through rotation), the smooth bore portion 79*a* presses against the outer surface 34*a* directing the same inwardly. Due to the different relief slots 39*a*, the portions of the outer surface 34*a* are deflected inwardly toward and into contact with the outer surface of the hose 106*a*. Continued rotation tightens the nut and further inwardly directs the crimp sleeve against the surface of the hose 106*a*, thereby sandwiching the hose 106*a* between the first side hose insert 42*a* on the inside and the first side internal bore 36*a* of the first crimp sleeve 22*a*. The cooperation of the surface pattern 37*a* of the first side internal bore 36*a* and the pattern 68*a* of the first side hose insert 42*a* provides additional seal strength so as to make a fluid tight connection. Preferably the nut is further tightened until the inner end 72*a* of the first clamping nut 16*a* reaches the first side 24 of the central body 20. In other embodiments, the nut may be tightened to a particular torque instead of being directed into contact with the central body 20.

The process of coupling the second clamping nut 16*b* is substantially identical. In particular, the second clamping nut 16*b* is directed over the distal end 32*b* of the second crimp sleeve 22*b*. The threaded portion of the bore 76*b* eventually contacts and initiates mating with the threaded region 38*b* of the second crimp sleeve 22*b*. As the clamping nut 16*b* is tightened (i.e., directed toward the central body through rotation), the smooth bore portion 79*b* presses against the outer surface 34*b* directing the same inwardly. Due to the different relief slots 39*b*, the portions of the outer surface 34*b* are deflected inwardly toward and into contact with the outer surface of the hose 106*b*. Continued rotation tightens the nut and further inwardly directs the crimp sleeve against the surface of the hose 106*b*, thereby sandwiching the hose 106*b* between the second side hose insert 42*b* on the inside and the second side internal bore 36*b* of the second crimp sleeve 22*b*. The cooperation of the surface pattern 37*b* of the second side internal bore 36*b* and the pattern 68*b* of the second side hose insert 42*b* provides additional seal strength so as to make a fluid tight connection. Preferably the nut is further tightened until the inner end 72*b* of the second clamping nut 16*b* reaches the second side 26 of the central body 20. In other embodiments, the nut may be tightened to a particular torque instead of being directed into contact with the central body 20.

Figure 14:
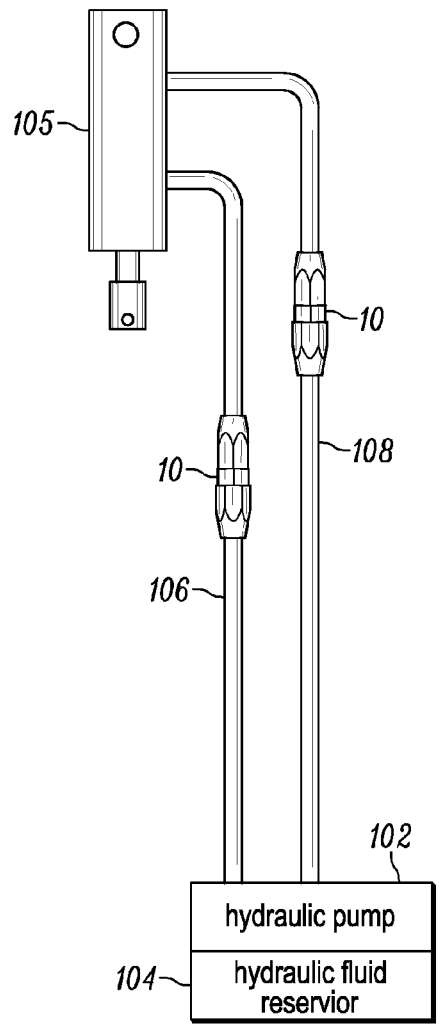
FIG. 14 of the drawings is a schematic representation of the hydraulic cylinder and pump assembly configuration of FIG. 13, showing, in particular, the repaired configuration with a pair of hose connector assemblies.

The same connection procedure can be followed to join the portions of the hose 106, 108, and the completed configuration is shown in FIG. 14. Once completed, the air can be bled from the system, and replaced with hydraulic fluid. The use of the two hose connector assemblies provides a hydraulic cylinder which can take advantage of existing hoses that are already installed, thereby not requiring the extensive removal process. It will be understood that the hose connector assembly of the present disclosure is configured to withstand large pressures of the type that would be found on such hydraulic equipment which is generally utilized for the operation of convertible tops. Through testing, such a hose connector assembly maintains a leak proof configuration at pressures in the area of 10,000 psi. Of course, this is merely exemplary, and the disclosure is not limited to use in association with such a pressure or pressures near or approximate to such a pressure.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A hose connector assembly for coupling two ends of a hose in a fluid tight configuration comprising:

a crimping sleeve having a central body with a first side and a second side, a first crimp sleeve extending outwardly from the first side of the central body and a second crimp sleeve extending outwardly from the second side of the central body, the crimping sleeve having an internal bore extending therethrough, each of the first and second crimp sleeves each including an outer surface having a threaded region, and at least one relief slot extending therealong inwardly from a distal end of each of the first and second crimp sleeves, the central body substantially corresponding in diameter to that of a hose crimped thereby;

a hose insert having a central body corresponding in diameter to that of a hose to be crimped within the crimping sleeve with a first side and a second side, a first side hose insert extending outwardly from the first side of the central body and defining a flange cooperatively with the first side of the central body so as to preclude further inward movement of a hose extending therearound and a second side hose insert extending outwardly from the second side of the central body and defining a flange cooperatively with the second side of the central body so as to preclude futher inward movement of a hose extending therearound, the central body of the hose insert configured to slidably traverse through the central body of the crimping sleeves, the hose insert having a central bore extending therethrough;

the hose insert being positionable within the crimping sleeve so that the central body of the hose insert is within the internal bore proximate the central body, with the first side hose insert extending into the portion of the internal bore corresponding to the first crimp sleeve and the second side hose insert extending into the portion of the internal bore corresponding to the second crimp sleeve, with a space defined between the first side hose insert and the first crimp sleeve and a space defined between the second side hose insert and the second crimp sleeve;

a first clamping nut having a bore extending therethrough, the bore including a threaded portion and a bore portion, whereupon threading of the first clamping nut onto the first crimp sleeve directs the first crimp sleeve axially inwardly toward the first side hose insert, thereby sandwiching a hose positioned within the space defined therebetween; and a second clamping nut having a bore extending therethrough, the bore including a threaded portion and a bore portion, whereupon threading of the second clamping nut onto the second crimp sleeve directs the second crimp sleeve axially inward toward the second side hose insert, thereby sandwiching a hose positioned within the space defined therebetween.

2. The assembly of claim 1 wherein the hose insert is slidably positionable within the internal bore of the crimping sleeve.

3. The assembly of claim 1 wherein the first crimp sleeve includes a proximal end and a distal end, the proximal end extending from the first side of the central body, the threaded portion extending from a point between the proximal end and the distal end toward the proximal end, with first crimp sleeve tapering inwardly from a point between the proximal end and the distal end toward the distal end.

4. The assembly of claim 3 wherein at least a portion of the first crimp sleeve has a conical configuration.

5. The assembly of claim 3 wherein the second crimp sleeve includes a proximal end and a distal end, the proximal end extending from the second side of the central body, the threaded portion extending from a point between the proximal end and the distal end toward the proximal end, with a second crimp sleeve tapering inwardly from a point between the proximal end and the distal end toward the distal end.

6. The assembly of claim 1 wherein the first side hose insert includes a pattern disposed on an outer surface thereof.

7. The assembly of claim 6 wherein the second side hose insert includes a pattern disposed on an outer surface thereof.

8. The assembly of claim 7 wherein the pattern of the first side hose insert comprises a plurality of barbs which resist disconnection of a hose extending therearound, and wherein the pattern of the second side hose insert comprises a plurality of barbs which resist disconnection of a hose extending therearound.

9. The assembly of claim 8 wherein the portion of the internal bore of the central body corresponding to each of the first crimp sleeve and the second crimp sleeve include a surface pattern thereon.

10. The assembly of claim 1 wherein the bore portion of the bore of the first and second clamping nuts are inwardly tapered so as to reduce the diameter thereof toward an outer end thereof.

11. The assembly of claim 10 wherein each of the first and second clamping nuts include an outer surface, the outer surface including a hexagonal configuration for readily accepting a wrench.

12. The assembly of claim 1 wherein each of the first and second crimp sleeves include at least two relief slots that are radially spaced apart from each other.

13. The assembly of claim 12 wherein the at least two relief slots of each of the first and second crimp sleeves are equidistantly radially spaced apart from each other.

14. The assembly of claim 1 wherein the central body of the hose insert includes a first side and a second side, and an outer surface spanning therebetween, a chamfer defined at the first side of the outer surface and a chamfer defined at the second side of the outer surface.

15. A method of coupling a first hose end and a second hose end, the method comprising the steps of:
   providing a first hose end;
   providing a second hose end;
   providing a hose connector assembly of claim 1;
   extending the first clamping nut along the first hose end;
   extending the second clamping nut along the second hose end
   inserting the first hose end into the space defined between the first side hose insert and the first crimp sleeve;
   inserting the second hose end into the space defined between the second side hose insert and the second crimp sleeve;
   tightening the first clamping nut onto the first crimp sleeve, thereby sandwiching the first hose end between the first crimp sleeve and the first side hose insert; and
   tightening the second clamping nut onto the second crimp sleeve, thereby sandwiching the second hose end between the second crimp sleeve and the second side hose insert.

* * * * *